(12) United States Patent
Girard et al.

(10) Patent No.: US 7,348,061 B2
(45) Date of Patent: Mar. 25, 2008

(54) SLIP-RESISTANT COATINGS AND SUBSTRATES COATED THEREWITH

(75) Inventors: Gregory B. Girard, Homewood, IL (US); Sandra A. Boehm, Homer Glen, IL (US); Anthony J. Lambrosa, Dyer, IN (US); Eddie C. Johnson, McDonough, GA (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 11/326,937

(22) Filed: Jan. 6, 2006

(65) Prior Publication Data

US 2006/0178455 A1 Aug. 10, 2006

Related U.S. Application Data

(60) Provisional application No. 60/642,035, filed on Jan. 7, 2005.

(51) Int. Cl.
*B32B 27/38* (2006.01)
*B32B 27/40* (2006.01)
*B32B 15/092* (2006.01)
*B32B 15/095* (2006.01)
*C08L 63/00* (2006.01)

(52) U.S. Cl. ............... 428/414; 428/413; 428/416; 428/418; 428/423.1; 523/457

(58) Field of Classification Search ........... 428/413, 428/414, 416, 418, 423.1; 523/400, 440, 523/457, 458, 459, 466
See application file for complete search history.

(56) References Cited

U.S. PATENT DOCUMENTS

| 4,146,403 | A | 3/1979 | Armanini et al. |
| 4,514,445 | A | 4/1985 | Hokamura et al. |
| 4,522,879 | A | 6/1985 | Krueger |
| 4,755,229 | A | 7/1988 | Armanini et al. |
| 5,013,770 | A | 5/1991 | Carpenter et al. |
| 5,585,427 | A | 12/1996 | Schimmel et al. |
| 5,618,860 | A | 4/1997 | Mowrer et al. |
| 6,107,387 | A | 8/2000 | Kaylo et al. |
| 6,211,262 | B1 | 4/2001 | Mejiritski et al. |
| 6,309,757 | B1 | 10/2001 | Carlblom et al. |
| 6,468,336 | B1 | 10/2002 | Fiedler et al. |
| 6,639,025 | B2 | 10/2003 | Sakugawa |

FOREIGN PATENT DOCUMENTS

| GB | 1167900 | * | 10/1969 |
| JP | 58-013670 | * | 1/1983 |
| JP | 58-015570 | * | 1/1983 |

OTHER PUBLICATIONS

JPO abstract of JP 58-015570.*
Derwent abstract of JP 58-015570.*
JPO abstract of JP 58-013670.*
Derwent abstract of JP 58-013670.*
English translation of JP 58-013670, provided by the USPTO (2007).*
English translation of JP 58-015570, provided by the USPTO (2007).*
Detter Mineralien GmbH, Technical Data Sheet, Micaceous Iron Oxide, Jan. 2003.
Research Council on Structural Connections, Specifications for Structural Joints Using ASTM A325 or A490 Bolts, Jun. 23, 2000 (pp. 1-39 and 40-81).

* cited by examiner

*Primary Examiner*—Michael J. Feely
(74) *Attorney, Agent, or Firm*—Robert E. McDonald; Vivien Y. Tsang; Eryn Ace Fuhrer

(57) ABSTRACT

A slip-resistant coating composition comprising
(i) a binder comprising a polyepoxide and a polyamine;
(ii) a micaceous pigment selected from the group consisting of mica and micaceous iron oxide and blends thereof;
(iii) at least one other pigment;
wherein the micaceous pigment is present at a level of at least 4% PVC based on total volume solids and wherein the total PVC of the coating is at least 35%. The slip-resistant coating would have a slip coefficient of at least 0.50 after cure and is especially useful in the manufacture of structural joints.

15 Claims, No Drawings

US 7,348,061 B2

SLIP-RESISTANT COATINGS AND SUBSTRATES COATED THEREWITH

This application claims priority from U.S. Provisional Application Ser. No. 60/642,035 filed Jan. 7, 2005, the entirety of which is incorporated herein by reference.

This invention relates to coated substrates, especially coated substrates utilized in structural joints. Many metal substrates, such as those utilized in the chemical industry, bridge and highway construction, and other structural steel applications are utilized in very corrosive environments and must be protected by corrosion inhibiting coatings. Many of these applications, such as those, for example, involved in connecting I-beams in construction applications, also require that the coatings do not have a significant adverse effect on the slip-resistance of the coated beams when they are in contact with each other, such as when bolted together in a structural joint.

Typically a joint between two structural elements would be affixed with bolts or other fastening devices. The inner faces which are in contact may be subject to shear and tension forces which can result in eventual failure of the joint due to excessive movement, or slip, of one component of the joint relative to the other. Therefore, a high resistance to slip is desirable in many applications.

Specifications have been established to determine the slip coefficient for coatings used in bolted structural joints. Standard methods for evaluating and determining the slip coefficient of coatings in a face-to-face arrangement, such as a structural joint, are set forth in *Specification for Structural Joints Using ASTM A-325 or 490 Bolts*, dated Jun. 23, 2000, published by the Research Council on Structural Connections, the teaching of which is hereby incorporated by reference (the "Specification"). Copies of the referenced Specification are available from the Research Council on Structural Connections, c/o American Institute of Steel Construction, Inc., 1 East Wacker Drive, Suite 3100, Chicago, Ill. 60601 or at www.boltcouncil.org. In particular, Appendix A of that Specification entitled "Testing Method to Determine the Slip Coefficient for Coatings Used in Bolted Joints" sets forth the test protocol. The test protocol provides for the preparation of steel panels which are coated with the desired coating to a specified film thickness and allowed to dry. Three test panels are affixed within a clamping system at a specified clamping force. The middle panel is arranged at a different height than the outer two and the clamped panels are then subjected to a compressive load. The compressive load is increased and movement of the panels measured. A slip load, defined as the load corresponding to a specified level of deformation of the tested panels is measured, and the slip coefficient $K_s$ is determined as the ratio of slip load to twice the clamping force according to the formula:

$$K_s = \text{slip load}/2 \times \text{clamping force.}$$

An average of five readings is utilized to determine the mean slip coefficient. Tension creep test protocols are also set forth in the Specification and creep deformation, i.e., movement of the panels away from each other, can also be measured.

For many joint structures, a "Class B" rating of a mean slip coefficient of at least 0.50 is desirable.

Prior art zinc rich coatings which can attain the Class B rating of a slip coefficient of at least 0.50 are known. However, there are a number of drawbacks to zinc rich coatings. The zinc rich coatings are typically relatively expensive, they are difficult to recoat, the zinc particles are often difficult to maintain in suspension, and there can be environmental concerns with the handling and disposal of zinc materials.

Additionally, it is frequently advantageous to coat the steel substrates at a location which is remote from the actual construction site in order to minimize exposure to environmental conditions as the substrate is shipped and handled. Also, it is often easier and faster to paint the substrate in a shop environment, rather than once it has been installed at a construction location. Frequently, it is desirable to have multiple layers of coatings on the substrates. For example, the substrate may be coated with both a primer and a top coat and possibly with one or more intermediate coats between the primer and the top coat.

In the case of a zinc rich primer, any slip critical connections, such as the areas where beams would be bolted together and have face-to-face contact with the coating, it is necessary to tape off, or otherwise mask, the slip critical connections of these zinc rich primers prior to applying any intermediate coats or top coats that would adversely affect slip resistance. These additional labor steps increase the cost and complexity of preparing the coated substrates in a shop environment.

Applicants have now determined that an apparatus, such as a structural joint, and comprising a first coated substrate and a second coated substrate arranged in a face-to-face relationship so as to maintain the contact between the coated surface of the first substrate and the coated surface of the second substrate can have excellent slip resistance and a slip coefficient of at least 0.50 when the coating compositions each comprise:

(i) a binder comprising a polyepoxide and a polyamine;
(ii) a micaceous pigment selected from the group consisting of mica and micaceous iron oxide and blends thereof;
(iii) at least one other pigment; and wherein the micaceous pigment is present at a level of at least 4% PVC and the total PVC of each coating is at least 35%. In one useful embodiment, the coatings of this invention would have less than 1% zinc particles by weight, and preferably would be substantially free of zinc particles. Since the coating compositions of this invention can be arranged in a face-to-face relationship with excellent slip resistance, the substrates which comprise the apparatus could be initially primed, if desired, with a primer, such as a zinc rich primer, then coated with the slip-resistant coatings of this invention without masking of the slip critical joints, and subsequently arranged in the apparatus.

The binder for the coating useful in this invention will comprise the reactive admixture of a polyepoxide and a polyamine. Typically the two reactive materials are maintained as separate components until mixed just prior to application. Representative polyamine and polyepoxide materials are well known in the art.

Polyepoxides potential usefully in the practice of this invention have an average of at least two epoxy groups per molecule and include aliphatic and aromatic polyepoxides, such as those prepared by the reaction of an aliphatic polyol or polyhydric phenol and an epihalohydrin. Other useful epoxies include epoxided oils and epoxy-functional copolymers such as acrylic polymers derived from ethylenically unsaturated epoxy-functional monomers such glycidyl acrylate or glycidyl methacrylate in combination with other copolymerizer monomers.

The polyamines which are useful in this invention include those having an average of at least two reactive amine groups per molecule. Polyamines are well known in the art and can be prepared by a variety of methods such as by the free radical polymerization of acrylic or other unsaturated monomers having primary or secondary amine functionality, or by the reaction of amines having at least two amino groups per molecule with a polycarboxylic acid to form polyamide amines, or by the reaction of primary amines with epoxy materials to produce secondary amine and hydroxylic functionality. The polyamines can also be polymeric or lower molecular weight materials such as piperazine, tetraethylenepentamine, 1,2-diaminopropane, etc. The polyamines could also be amine precursors which convert to amine groups under curing conditions, such as ketimines or aldimines.

The coatings of this invention also will incorporate a micaceous pigment. As used herein, "micaceous" is intended to include those particulate materials having a generally lamellar structure, or characteristics, and would include micaceous iron oxide and micas. Optionally, the micas can be treated with metal oxides as is well known in the art, such as representatively set forth in U.S. Pat. No. 4,755,229, the teaching of which is hereby incorporated by reference. For certain embodiments of this invention, the micaceous pigments should be present at a level of at least 4% PVC and for many embodiments would be present at a level of 4% to about 15% PVC based upon the total volume solids of the coatings. In one useful embodiment, the total PVC of the coating, including all of the pigments, would be at least 35% PVC. In some embodiments, the total PVC of the coating would range from about 35% to about 55%.

The coatings used in this invention will include at least one other pigment in addition to the micaceous pigment. In some embodiments of this invention, silica pigments have been useful. Other pigments such as talcs, clays, titanium dioxide, carbon black and other known organic or inorganic pigments can also be incorporated.

The coatings of this invention can also be formulated to include additives which do not adversely affect the slip resistance of the coating. Suitable amounts of solvents, thixotropic agents, diluents, hydrocarbon resins, catalysts and other materials can be utilized. In one useful embodiment, the coatings of this invention are solvent based.

The slip-resistant coatings of this invention may typically be applied to any substrate but are especially intended for application to metal substrates, particularly ferrous metals. In one particular embodiment, it is especially useful to apply the coatings of this invention to steel substrates which have been sand blasted, or otherwise abraded. In certain embodiments, the substrates optionally may be coated with a primer prior to application of the slip-resistant coating. For some embodiments, it is especially useful to utilize a corrosion resistant primer, such as a zinc rich primer, which is applied directly to the substrate and allowed to dry prior to the application of the coating of this invention. Formulations for zinc rich primers are well known in the art.

For some embodiments, it will also be useful to apply a top coat coating composition onto at least a portion of the surface of the cured or dried slip-resistant coating of this invention to provide a multi-coat final finish. The top coat could be any top coat known in the art which can cure or dry under the appropriate conditions for use of these products. The top coat could include, for example, two-component polyurethane or polyamide coatings, polyepoxies, alkyds, etc. In order to obtain the very favorable slip-resistance properties of the coatings of this invention, for example in structural joint assemblies, the portions of the cured coating of this invention intended to be in a face-to-face arrangement with a similar slip-resistant coated part would be masked or shielded prior to application of the topcoat onto some or all of the remaining coated surface to ensure that the cured coating of this invention could be in direct contact with a similar slip-resistant facing. Alternatively, the structural joint could be assembled using substrates coated with the slip-resistant coating of this invention followed by top coating of some or all of the remaining exposed surface area.

If a primer, such as for example, a zinc rich primer, is utilized in combination with the coating of this invention, the primer would typically be applied to provide a dry film thickness (dft) ranging from about 0.5 to about 10 mils dft. The coating of this invention, when applied either directly to the substrate, or to the primer which has been applied to the substrate, would typically be applied to provide a dry film thickness of about 1 to about 20 mils dft. In those cases where an additional top coat is desired on at least a portion of the cured coating of this invention, it would be applied to the coating of this invention in order to provide a dry film thickness of the top coat ranging from about 1 to about 20 mils dry film thickness. Substrates coated with the slip-resistant coatings of this invention can be arranged in face-to-face contact of the cured slip-resistant coating in an apparatus and still maintain a desirable slip resistance.

The following examples have been selected to illustrate specific embodiments and practices of advantage to a more complete understanding of the invention. Unless otherwise stated, "parts" means parts-by-weight and "percent" is percent-by-weight". Pigment Volume Concentration is the ratio of the volume of pigment to the volume of the total non-volatile material (i.e. pigment and binder) present in the coating.

EXAMPLE 1

A two-component polyamine/epoxy coating was prepared as follows:

Polyamine Component

The polyamine component was prepared as described below by mixing the identified materials on a high speed mixer:

| Material | Parts |
| --- | --- |
| Polyamide resin[1] | 151.8 |
| Hydrocarbon resin[2] | 59.2 |
| 2,4,6-tris(dimethylaminoethyl) phenol | 13.7 |
| tackifying resin[3] | 40.5 |
| xylene | 28.6 |
| soya lecithin | 6.9 |
| defoamer/wetting additive[4] | 1.4 |
| surfactant[5] | 3.2 |
| clay pigment[6] | 19.0 |
| thixotrope[7] | 22.0 |
| xylene | 117.5 |
| basic cadmium zinc molybdate pigment | 80.0 |
| red oxide pigment | 65.0 |
| furnace black pigment | 1.0 |
| Mica 221 mica pigment | 215.0 |
| Silica pigment[8] | 128.0 |
| Silica pigment[9] | 215.0 |

[1]Versamid 115 - 70% NVM polyamide amine resin from Cognis
[2]Nevoxy EPX-LH alkyl phenol hydrocarbon
[3]Cumar R-27-10 Coumarine Indene resin from Neville Chemicals
[4]Byk 052 polyvinyl ether from Byk Chemie This polyamine component, by itself, has a Pigment Volume Concentration (PVC) of 52.99%, and is 76.87% solid by weight (NVM) and 59.41% solids by volume (NVV).

| Polyepoxide Component | |
|---|---|
| Material | Parts |
| Methyl n-amyl ketone | 97.1 |
| Xylene | 53.0 |
| Epoxy resin[10] | 251.4 |
| tackifying resin[11] | 115.9 |
| defoamer[12] | 2.8 |
| thixotrope[13] | 20.6 |
| silica pigment[14] | 451.2 |
| silica pigment[15] | 190.1 |
| xylene | 30.3 |
| clay pigment[16] | 24.3 |
| xylene | 4.83 |
| wetting agent/defoamer[17] | 3.0 |

[5]Arquad 2C-75 from AKZO Chemicals
[6]Attagel 40 attapulgite clay from Englehard
[7]MPA 1078X thixotropic wax from Elementis
[8]INSIL 1240 from Illinois Mineral Company
[9]1250 Novacite from Malvern Minerals
[10]Araldite GZ 540 X-90 epoxy resin, 255 eq. wt. from Ciba Geigy
[11]Cumar R-27-10 Coumarine Indene resin from Neville Chemicals
[12]Byk 052 polyvinyl ether from Byk Chemie
[13]MPA 1078X thixotropic wax from Elementis
[14]INSIL 1240 from Illinois Mineral Company
[15]1250 Novacite from Malvern Minerals
[16]Attagel 40 attapulgite clay from Englehard
[17]Arquad 2C-75 from AKZO Chemicals[17]

This Polyepoxide Component, by itself, has a PVC of 45.21%, an NVM of 81.86% and an NVV of 67.44%.

The Polyepoxide Component and the Polyamine Component were combined in a 1 to 1 volume ratio to provide a final curable coating, applied over sandblasted steel substrates and also over steel substrates which had been primed with a commercially available zinc rich primer, Zinc Clad® II Plus primer commercially available from The Sherwin-Williams Company. The coated panels were tested for slip coefficient and creep resistance as described herein. The sand-blasted panels coated with the coating of this invention showed a slip coefficient of 0.53 and met the Class "B" requirements set forth in the Specification for Structural Joints using ASTM A 325 or A490 Bolts, as established by the Research Council on Structural Connections. The Zinc Clad® II Plus primed panels showed a slip coefficient of 0.56 and also met the Class "B" requirements.

The slip-resistant coating prepared by the combination of the two components had a PVC of 49.1% and the PVC of the mica pigment only was 7.6%, based on total coating solids.

While this invention has been described by a specific number of embodiments, other variations and modifications may be made without departing from the spirit and scope of the invention as set forth in the appended claims. The entire disclosures of applications, patents, and publications cited herein are hereby incorporated by reference.

The invention claimed is:

1. A substrate coated with a multi-layer coating wherein said multi-layer coating comprises:
   (1) a zinc particle containing primer applied directly to the substrate;
   (2) a second coating applied to the zinc particle containing primer layer, said second coating comprising: (i) a binder comprising a polyepoxide and a polyamine; (ii) a micaceous pigment selected from the group consisting of mica and micaceous iron oxide and blends thereof; and (iii) at least one other pigment;
   wherein the micaceous pigment is present at a level of at least 4% PVC based on total volume solids of the second coating, and the total PVC of the second coating is at least 35%.

2. The coated substrate of claim 1 wherein a third coating is applied to some or all of the surface of the second coating.

3. The coated substrate of claim 2 wherein the third coating is a two-component polyurethane.

4. The coated substrate of claim 2 wherein the third coating is applied to less than all of the surface of the second coating.

5. The coated substrate of claim 1 wherein the second coating is characterized as having a slip coefficient of at least 0.50 after cure.

6. The coated substrate of claim 1 wherein the second coating has less than 1% by weight zinc particles.

7. The coated substrate of claim 1 wherein the second coating is substantially free of zinc particles.

8. The coated substrate of claim 1 wherein the second coating is applied to provide a dry film thickness after cure of greater than 2.0 mils.

9. An apparatus comprising: a first substrate coated at least in part with a first cured coating composition; a second substrate coated at least in part with a second cured coating composition which may be the same or different from said first coating composition;
   wherein said first coated substrate and said second coated substrate are arranged in a face-to-face relationship so as to maintain contact between the coated surface of the first substrate and the coated surface of the second substrate;
   wherein the first and second coating compositions each comprise: (i) a binder comprising a polyepoxide and a polyamine; (ii) a micaceous pigment selected from the group consisting of mica and micaceous iron oxide and blends thereof; and (iii) at least one other pigment;
   wherein the micaceous pigment is present at a level of at least 4% Pvc in each coating, and the total PVC of each coating is at least 35%; and
   wherein a cured zinc particle containing primer is an intermediate layer between at least one of: the first substrate and the first cured coating composition, and the second substrate and the second cured coating composition.

10. The apparatus of claim 9 wherein both the first cured coatings and the second cured coating have less than 1% by weight zinc particles.

11. The apparatus of claim 9 wherein both the first cured coating and the second cured coating are substantially free of zinc particles.

12. The apparatus of claim 9 wherein each of the coated substrates arranged in a face-to-face relationship have a slip coefficient of at least 0.50 after cure.

13. The apparatus of claim 9 wherein each of the first cured coating and the second cured coating contain the micaceous pigment at a level of 4% to 15% PVC.

14. The apparatus of claim 9 wherein each of the first cured coating and the second cured coat have a total PVC between about 35% and 55%.

15. The apparatus of claim 9 wherein the apparatus is a structural joint.

* * * * *